US007755610B2

(12) United States Patent
Capurso et al.

(10) Patent No.: US 7,755,610 B2
(45) Date of Patent: Jul. 13, 2010

(54) WRITING DEVICE FOR BISTABLE MATERIAL WITH IMPROVED FLEXIBLE MATERIAL ALIGNMENT FEATURES

(75) Inventors: Robert G. Capurso, Bergen, NY (US); Theodore K. Ricks, Rochester, NY (US); David M. Johnson, West Henrietta, NY (US); Domenic Maiola, Rochester, NY (US)

(73) Assignee: Industrial Technology Research Institute, Hsinchu (TW)

( * ) Notice: Subject to any disclaimer, the term of this patent is extended or adjusted under 35 U.S.C. 154(b) by 1564 days.

(21) Appl. No.: 11/048,539

(22) Filed: Feb. 1, 2005

(65) Prior Publication Data

US 2006/0168860 A1 Aug. 3, 2006

(51) Int. Cl.
*G06F 3/041* (2006.01)

(52) U.S. Cl. ............................ 345/173; 40/617; 349/12

(58) Field of Classification Search ................. 349/166, 349/12; 345/173; 40/617
See application file for complete search history.

(56) References Cited

U.S. PATENT DOCUMENTS

| | | | | |
|---|---|---|---|---|
| 4,808,112 | A | 2/1989 | Wood et al. | |
| 6,269,225 | B1 | 7/2001 | Sato et al. | |
| 6,424,387 | B2 | 7/2002 | Sato et al. | |
| 6,614,499 | B1 * | 9/2003 | Petruchik | 349/149 |
| 2003/0021541 | A1 | 1/2003 | Carpenter | |
| 2003/0128080 | A1 | 7/2003 | Viswanathan et al. | |

FOREIGN PATENT DOCUMENTS

| | | |
|---|---|---|
| WO | 03/083561 A2 | 10/2003 |
| WO | 03/083613 A2 | 10/2003 |

OTHER PUBLICATIONS

Robert G. Capurso et al., "Electronic Signage", U.S. Appl. No. 10/851,907, filed May 21, 2004.

* cited by examiner

*Primary Examiner*—David Nelms
*Assistant Examiner*—Nathanael R Briggs
(74) *Attorney, Agent, or Firm*—Alston & Bird LLP

(57) ABSTRACT

A system and method for writing bistable media is described, wherein the media has at least one through hole that interacts with at least one protrusion on a writer to align the media with the writer.

29 Claims, 10 Drawing Sheets

WRITING DEVICE FOR BISTABLE MATERIAL WITH IMPROVED FLEXIBLE MATERIAL ALIGNMENT FEATURES

FIELD OF INVENTION

The present invention relates to a device and method for writing a flexible, bi-stable display.

BACKGROUND OF INVENTION

Electronic signs are becoming popular in retail stores in order to keep pricing and sale information as current as possible. For example, prices can be kept up-to-date without having to reprint and dispose of paper pricing sheets whenever there is a sale or price change. The retailer can electronically write the information to a thin, flexible bi-stable sheet of prepared media and use it as a drop in replacement for a paper sign in their current signage holders. The customer benefits by having clear up-to-date information they need about the product, and the retailer benefits by having programmable information that can be readily changed and rewritten by electronic means.

One example of an electronic sign as discussed above is described in WO 03/083561 A2, which discloses an electronically programmable/controllable sign including multilayer displays for retail signage. The displays are fabricated with bi-stable material such as cholesteric liquid crystal material, which can maintain a viewable state indefinitely in the absence of power. The sign is permanently connected to a programmer/controller and drivers.

Another example of an electronic sign is described in WO 03/083613 A2. It discloses a system including low power electronic signs, a remote location managing system for communicating with the plurality of signs, and means of wireless communication to said signs via a computer network connected to a server computer. The system utilizes the advantage of a bi-stable display by using a power source only when necessary to change the state of the display.

One problem with the signage systems described in the above publications is the cost involved in fitting a complete retail store with multiple, fully integrated signs, wherein each sign includes electronics, a power source, and encasements or frames. Most retail stores have hundreds of pricing signs throughout the store. Most of these signs need price changes once a week or less. It may not be economical to purchase a system such as those described above when many of the signs do not require frequent updates.

Another problem with the systems described above is that the signs include the electronics and power source, and are a costly substitute for paper signs, which is what they are often replacing. Because of the added thickness of the electronic signs caused by the electronics and power source, the signs can be difficult to mount on item racks and in holders pre-existing in stores for paper signs. These systems fail to offer a simple, cost effective way to stock a retail store with affordable, rewritable signs, which fit more closely with a retailer's current pricing scheme.

One method of providing a more cost effective system is set forth in U.S. patent application Ser. No. 10/851,907 to Capurso et al., filed May 21, 2004, wherein bistable displays, capable of displaying information in the absence of power, are coupled with one or more powered display stands or independent writers capable of writing information to each display individually. This system allows frequently changed displays to be in a powered display holder, while infrequently updated displays can be rewritten by removal and placement in a writer.

The difficulty in using a separate writer from the display occurs in aligning the electrical connections of the display with those of the writer such that the display can be properly written every time. In order to achieve the best appearance for customer readability on bi-stable displays, finer resolutions (pixels per inch) are essential, meaning that electrical connections are closely spaced. Due to manufacturing errors, or different manufacturers' tolerances, each display can potentially have a slightly different arrangement of electrical connections, making writing of all displays with one writer difficult.

In manufacturing, it is known to provide some means of alignments between layers of a display for accuracy in manufacture and repeatability. For example, perforations can be used in film transportation operations, as disclosed in U.S. Pat. Nos. 6,269,225 and 6,424,387 to Sato. The use of the perforations allows control over film movement throughout processing, minimizing alignment error.

Various means of aligning electrical connections are known in the art. For example, U.S. Patent Application Publication No. US 2003/0021541 A1 refers to micro-replicated male and female features of optical devices for alignment of the device with a die. U.S. Patent Application Publication No. US 2003/0128080 A1 teaches male-female mechanical features aligning with a circuit board. U.S. Pat. No. 4,808,112 discloses the use of anisotropic adhesive to fix two flexible circuits together, and uses male/female features to promote alignment of the circuits. These aforementioned publications however refer to permanently mounting substrates to another substrate or circuit board.

There is therefore a need for a rewritable bi-stable display system in which a display can be accurately aligned for writing in a writing device and removed from the writing device for use in retail signage.

SUMMARY OF THE INVENTION

A system and method for writing bistable media is described, wherein the system comprises a writing device and bistable media, wherein the bistable media comprises a flexible substrate, a bistable material layer on the substrate, patterned electrical contacts, and at least one through hole in the substrate positioned with regard to one or more electrical contacts; and the writing device comprises a surface having at least one protrusion and a series of electrical conductors, wherein the at least one protrusion protrudes through and has at least a portion in contact with at least one through hole of the media, and the electrical conductors of the writer spatially align with the electrical contacts of the media.

ADVANTAGES

The bistable display system can be useful for providing inexpensive, changeable displays that can be quickly and accurately aligned and rewritten many times by a handheld or portable writer. The individual displays require no power. Only the writer is powered, reducing power requirements for the system. A single writer can be used for an entire system, again significantly reducing costs.

DETAILED DESCRIPTION OF THE INVENTION

In order to achieve the best appearance for customer readability on bi-stable electronic displays, finer resolutions (pixels per inch) are essential. In order to align to the electronic connections of such a display when writing, a precise method of alignment between the electrical connections of the display and corresponding connections of a writer is necessary. One means of achieving this level of precision is to incorporate one or more through hole in the display media for use in alignment during manufacturing operations. The through holes can be dimensionally very accurate and can retain their shape, keeping tight manufacturing tolerances over long distances. By utilizing precision through holes in the media, the necessary alignment to the electrical connections in a writing device can be achieved provided the proper design parameters are followed in the writing device. The through holes of the display can be used in the writing device to accurately align the electrical connections of the display with those of the writing device.

The invention will now be described with respect to certain preferred embodiments. Other equivalent materials, methods and means as encompassed by the claims are intended to be included in the invention.

Figure 1:
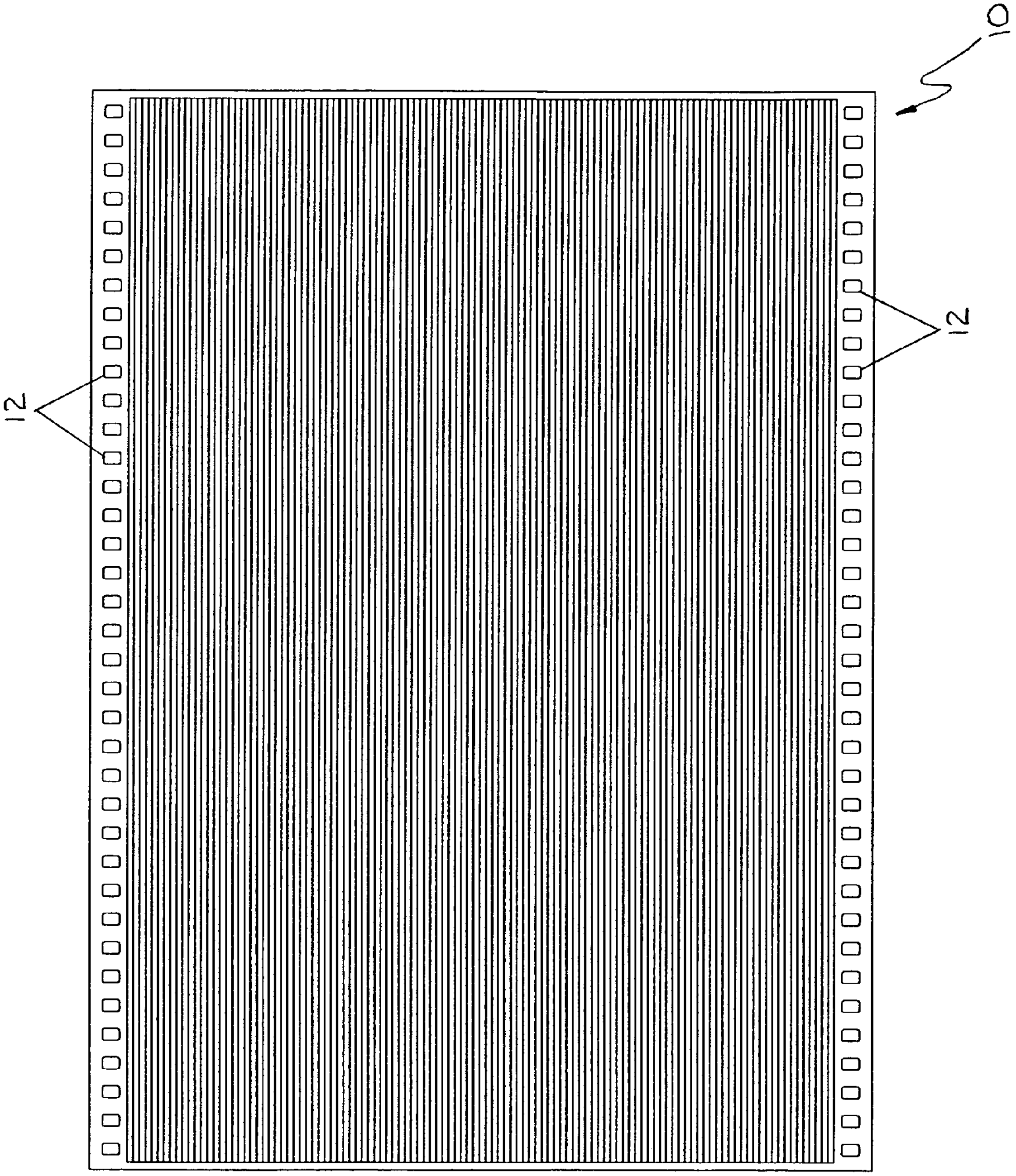
FIG. 1 is a back view of an example of a bistable display media with through holes.

FIG. 1 shows a back view of a bistable media 10 having precision through holes 12 to be used in conjunction with a writing device. Although shown with multiple through holes, one or more through holes can be present in the media. The through holes can be made by any method, including punching, dye-cutting, laser cutting, molding, etching, or ablation. The holes can be the same or different in size and shape.

Figure 2:
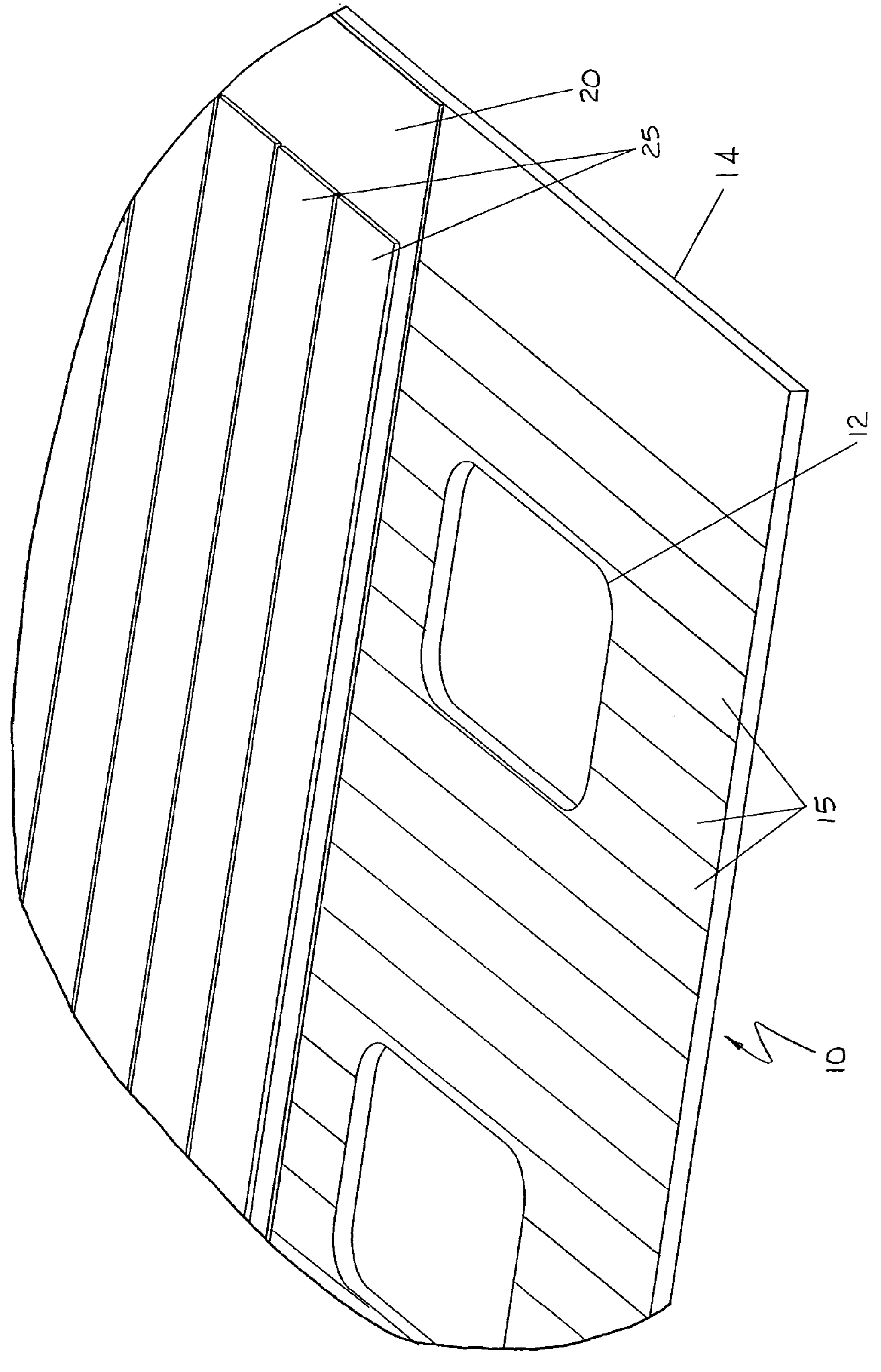
FIG. 2 is an enlarged back isometric view of the media.

FIG. 2 shows an enlarged isometric view of the back of bistable media 10 showing an array of first electrical contacts 15 over a flexible substrate 14. First electrical contacts 15 can be a conductive material such as indium tin oxide (ITO) or polythiophene. In one embodiment, ITO can be applied to flexible substrate 14 through vacuum deposition to form a single sheet of conductive material. Using the through holes 12 as a guide, the conductive material can be etched into individual conductive columns using an ablation process. Alternately, using through holes 12 as a guide, the conductive material can be laid down in any desired pattern through various application processes, for example, printing, coating, coating with a mask, or sputtering with a mask. According to another embodiment, the electrical contacts 15 can be used as a guide in forming the through holes, or the electrical contacts 15 and the through holes can be formed simultaneously.

After the conductive material layer is formed, a bistable material layer 20 can be deposited over the first electrical contacts 15 and the flexible substrate 14. Depending on the method of application of the bistable material layer 20, the bistable material may need to be removed from one or more portions of the first conductor to facilitate electrical connection during writing. The unwanted bistable material layer 20 can be removed during coating, or as a subsequent step. If precision coating techniques are employed, these additional processes of removal are not needed.

Examples of suitable bistable materials include, but are not limited to, electrochemical; electrophoretic, such as Gyricon particles; electrochromic; magnetic; or chiral nematic liquid crystals. According to certain embodiments, the bistable material can be chiral nematic liquid crystals, which can be polymer dispersed.

A light absorbing material layer, sometimes referred to as a dark layer, can be applied to the bistable material layer. The dark layer can absorb visible, ultraviolet, and/or infrared (IR) light. According to various embodiments, the dark layer can convert absorbed light to heat. According to various embodiments, the dark layer can absorb only a portion of the visible spectrum, and has a colored appearance. The dark layer can include one or more dyes, colorants, pigments, or materials capable of absorbing light, converting light to heat, or both. For example, the dark layer can include a black dye, pigment, or colorant; a metal, for example silver; or a colorless UV-absorber. The dark layer can be a thin layer of light absorbing, sub-micron carbon in a gel binder as described, for example, in U.S. Pat. No. 6,639,637 to Stephenson.

According to various embodiments, the bistable material layer and the dark layer can be co-extruded. The bistable material, light absorbing material, or both, can be in a binder. According to various embodiments, both can be in a gelatin binder.

The second electrical contacts 25 can be deposited on the bistable material layer 20, or on the dark layer when present, using the through holes 12 as a guide. According to another embodiment, the second electrical contacts 25 can be used as a guide in forming the through holes, or the second electrical contacts 25 and the through holes can be formed simultaneously. The second electrical contacts 25 can be formed in any desired pattern, for example, as a single large patch, as alpha-numeric or character segments, or as individual pixels. The second electrical contacts 25 can be formed as multiple rows, which can run parallel the direction of movement of the material during manufacture, called the web direction. The second electrical contacts 25 can be patterned non-parallel the first electrical contacts.

Figure 3:
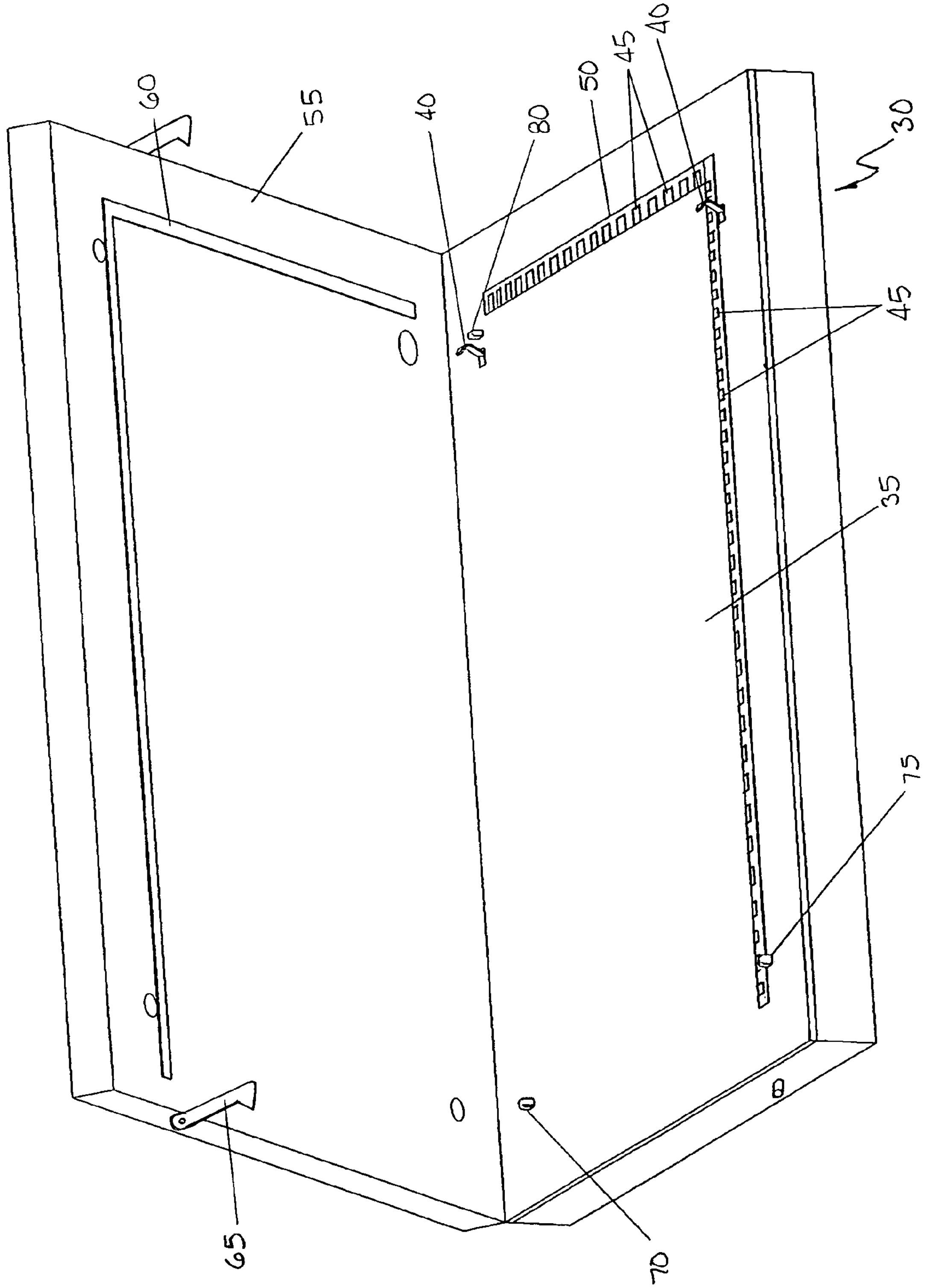
FIG. 3 is an isometric view of sign writing device of a preferred embodiment.

FIG. 3 shows a writing device 30. The writing device 30 can include a non-conductive writer surface 35 having a variety of locating protrusions 70, 75, and 80. Although three protrusions are shown, more or less protrusions can be present. The writer surface 35 can be flat, curved, concave, or convex. Also located on the writer surface 35 can be a tensioning mechanism 40 to create tension on the bistable media 10. The tensioning mechanism can include, for example, a spring, a leafspring, a flexure, a mechanical arm, gravity, or any combination of tensioning mechanisms.

Writer electrical conductors 45 can be on the writer surface 35 to provide electrical contact from the first electrical contacts 15 and second electrical contacts 25 of the bistable media 10 to a circuit, for example, flex circuit 50, of the writing device 30. The writer electrical conductors 45 can be positioned on the writer surface 35 relative to one or more of the locating protrusions 70, 75, and 80 to correspond to the position of the electrical connections of the first electrical contacts 15 and second electrical contacts 25 of the bistable media 10.

As shown in FIG. 3, the writing device 30 can include cover. The cover can be hinged cover 55. The hinged cover 55 can include compliant section 60. The compliant section 60 can be placed such that when the hinged cover 55 is closed over bistable media 10 on the writer surface 35, the compliant section 60 provides pressure on the bistable media 10 sufficient to create contact between first electrical contacts 15 and writer electrical conductors 45 of the flex circuit 50, and between second electrical contacts 25 and writer electrical conductors 45 of the flex circuit 50. The writing device 30 can include a retention device 65 to retain the hinged cover 55 against the writer surface 35.

According to various embodiments, the cover can be slidably connected to the writing device, or can fit over at least a portion of the writing device. The cover, whether connected to or separate from the writing device, should provide pressure on the bistable media sufficient to create contact between first electrical contacts and writer electrical conductors of the flex circuit, and between second electrical contacts and writer electrical conductors of the flex circuit.

The writing device can exert a force on the media to electrically connect the electrical contacts of the media with the electrical conductors of the writer. The force can be a vacuum, gravity, or a compressive force. The force can be an adhesive agent.

Figure 4A:
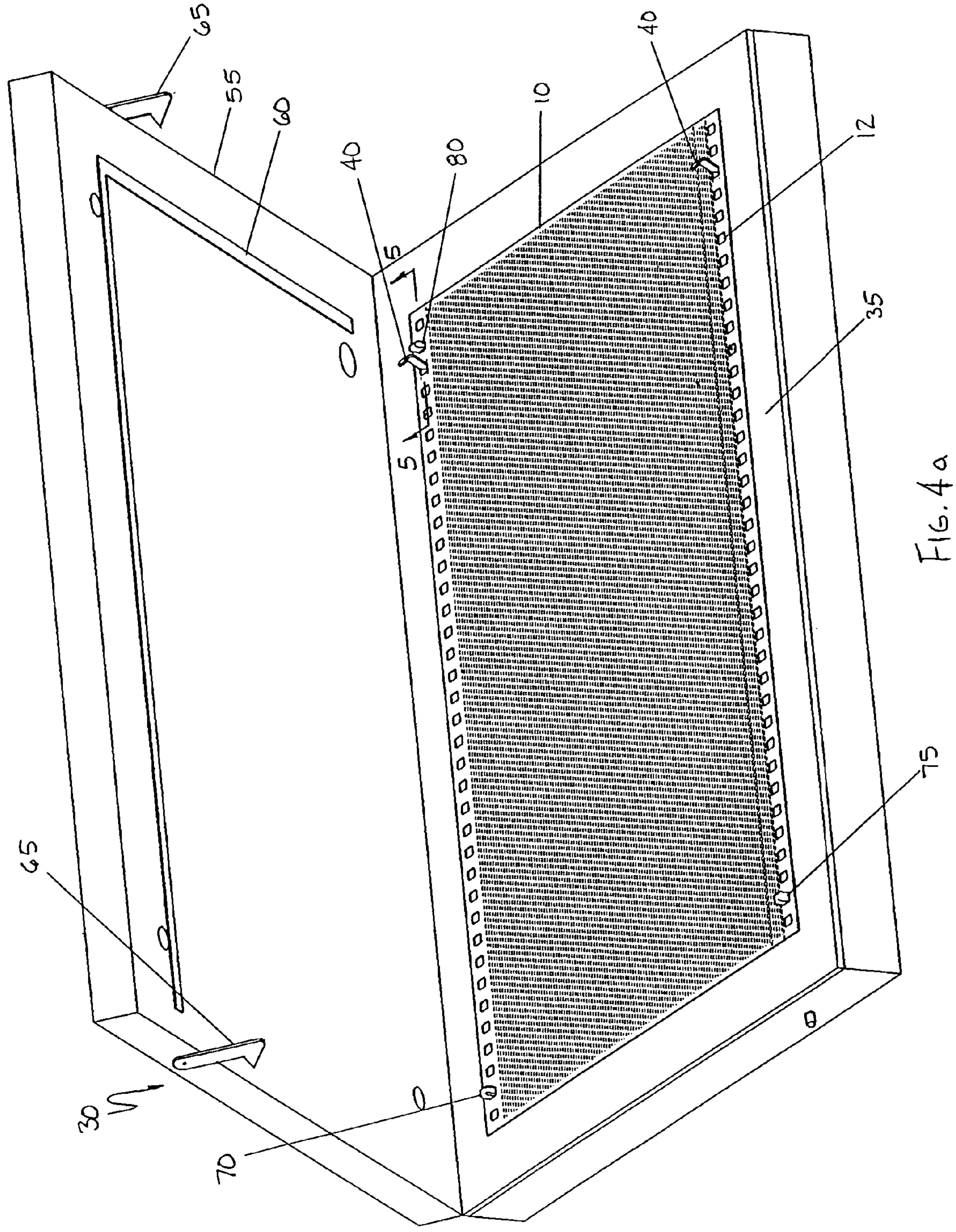
FIG. 4*a* is an isometric view of a bistable display located on the writing device.
Figure 4B:
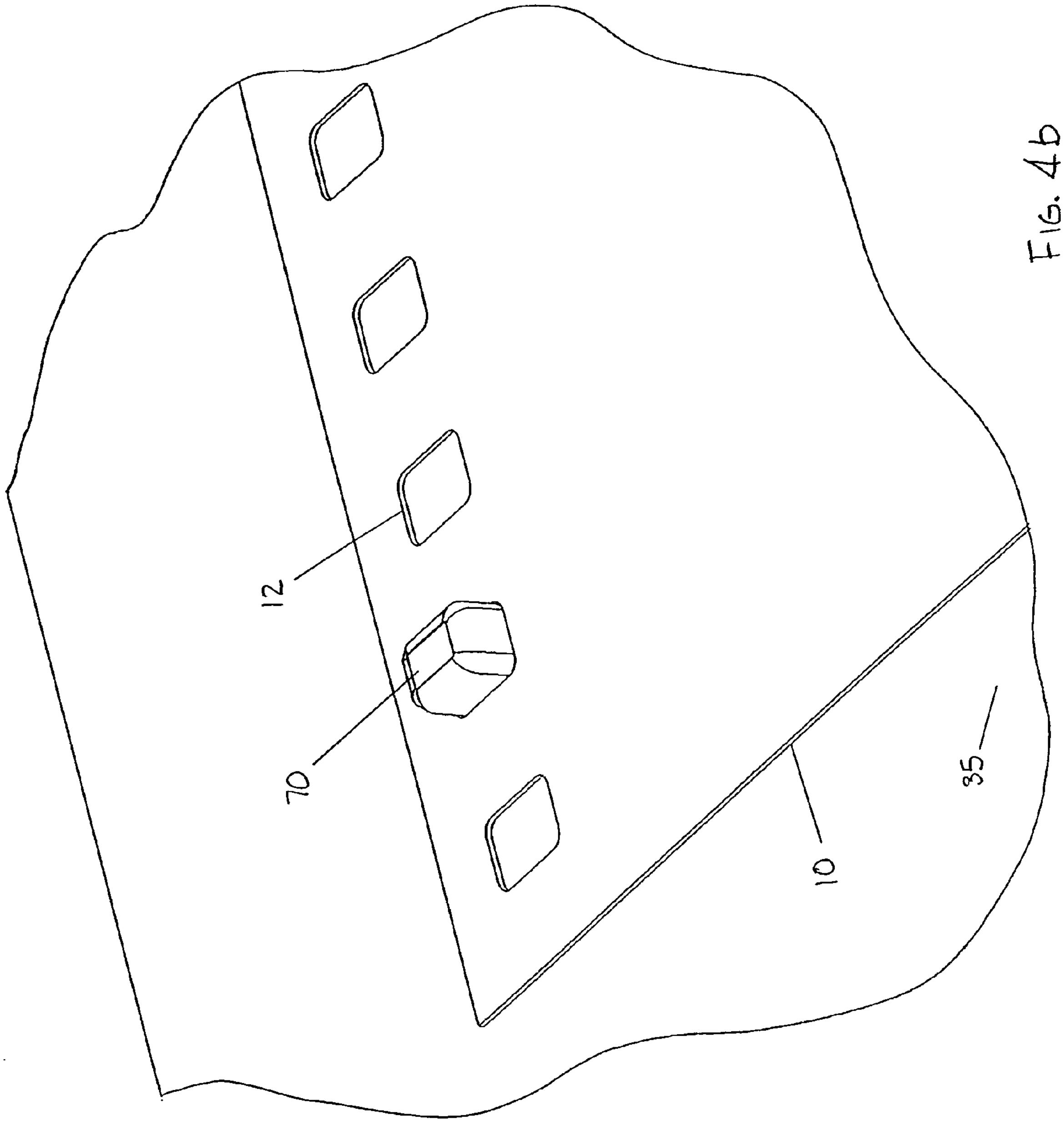
FIG. 4*b*-FIG. 4*d* show enlarged details of locating protrusions on the writing device shown in FIG. 4*a;*
Figure 4C:
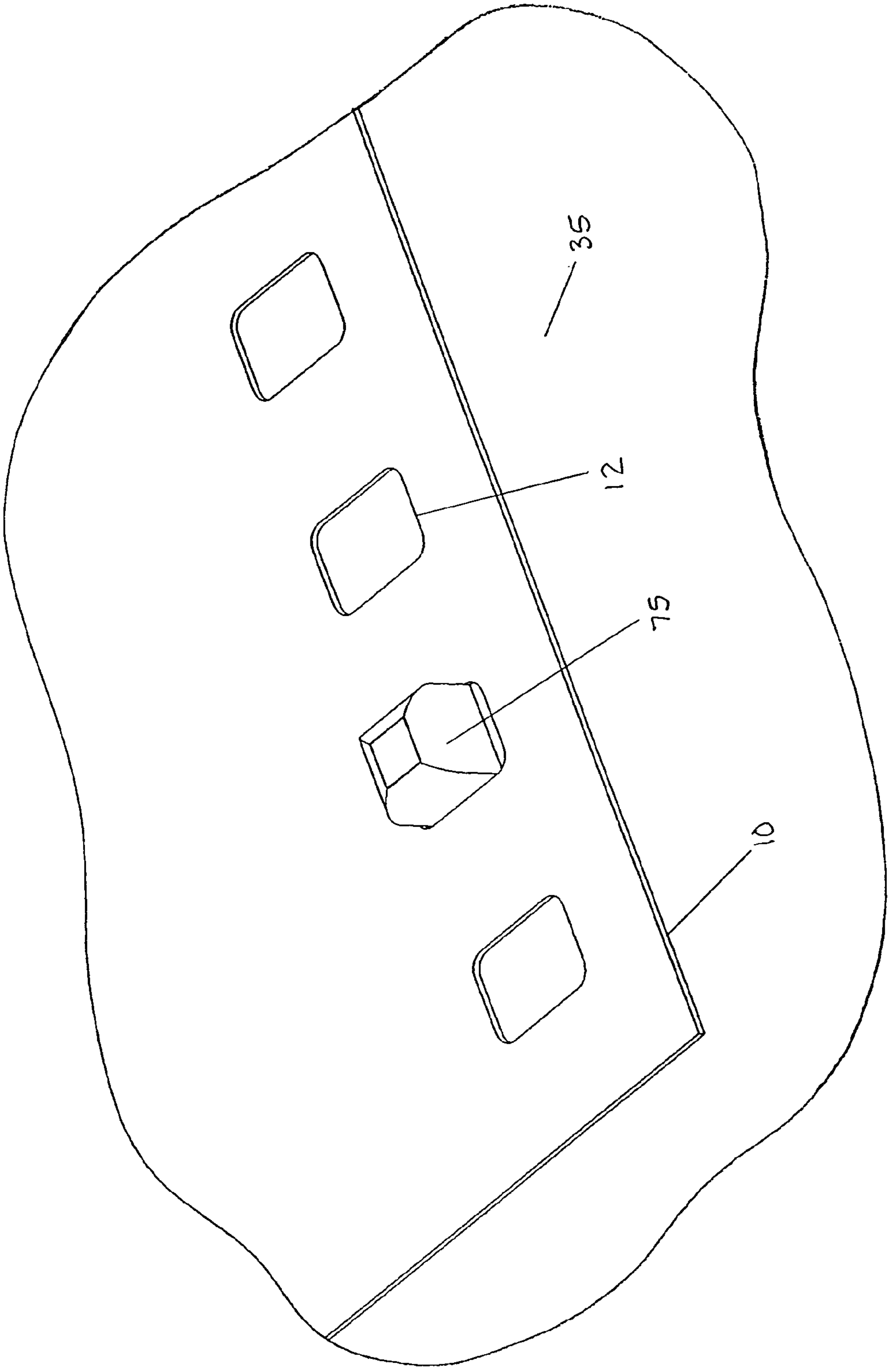
Figure 4D:
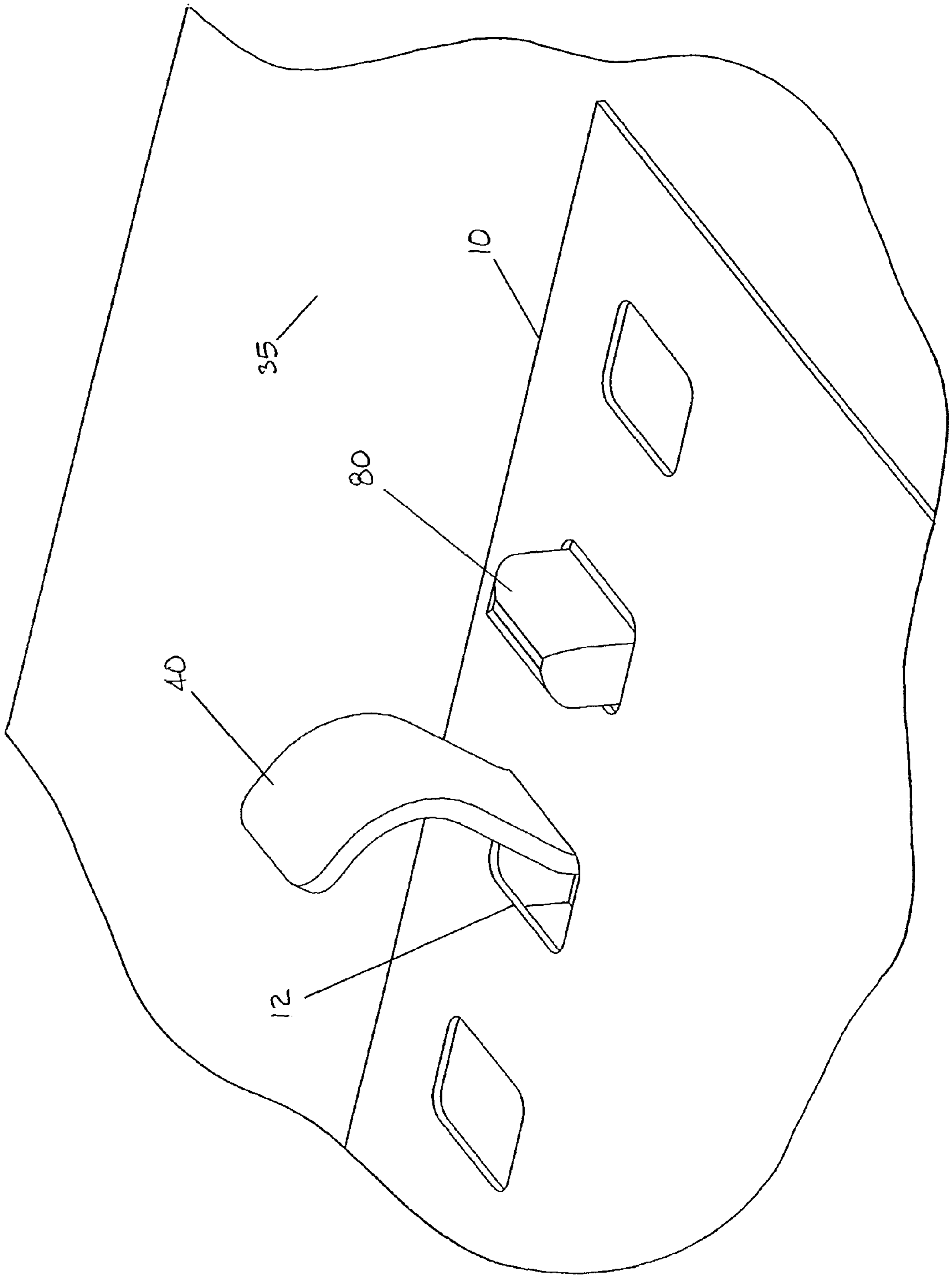

FIGS. 4*a*, 4*b*, 4*c* and 4*d* show the media 10 aligned onto the writer surface 35 of writing device 30. FIG. 4*a* shows the media precisely located over protrusions 70, 75, and 80. FIG. 4*b* shows an enlarged view of the through hole 12 of bistable media 10 located over protrusion 70 in the upper left region of writer surface 35. This provides close fit alignment on all sides of the through hole 12, thereby anchoring the media 10 in place on the writer surface 35. FIG. 4*c* shows the second protrusion 75 located in the lower left of writer surface 35 aligning the through hole 12 on its left and right surfaces and has clearance on the top and bottom. FIG. 4*d* shows the bistable media 10 laid over protrusion 80 at the upper right area of the writer surface 35 which closely aligns with the top and bottom of the through hole 12, while allowing clearance from side to side. FIG. 4*d* also shows through hole 12 sliding over tensioning mechanism 40, which provides tension to the bistable media 10. This compensates for expansion and contraction of the media 10 as well as tolerance build-up to ensure the bistable media 10 will lay flat on the writer surface 35 without buckling, which hinders accurate alignment.

Although demonstrated with three protrusions located in comers of the media, one or more protrusions can be located on the writer surface in any position corresponding to through holes in the media, wherein the positioning of the protrusions holds the media to the writer with precise alignment in an x-, y-, and theta direction. The protrusions and through holes can each be any shape, so long as the interaction of the protrusion and through hole is without significant slippage or movement.

Figure 5:
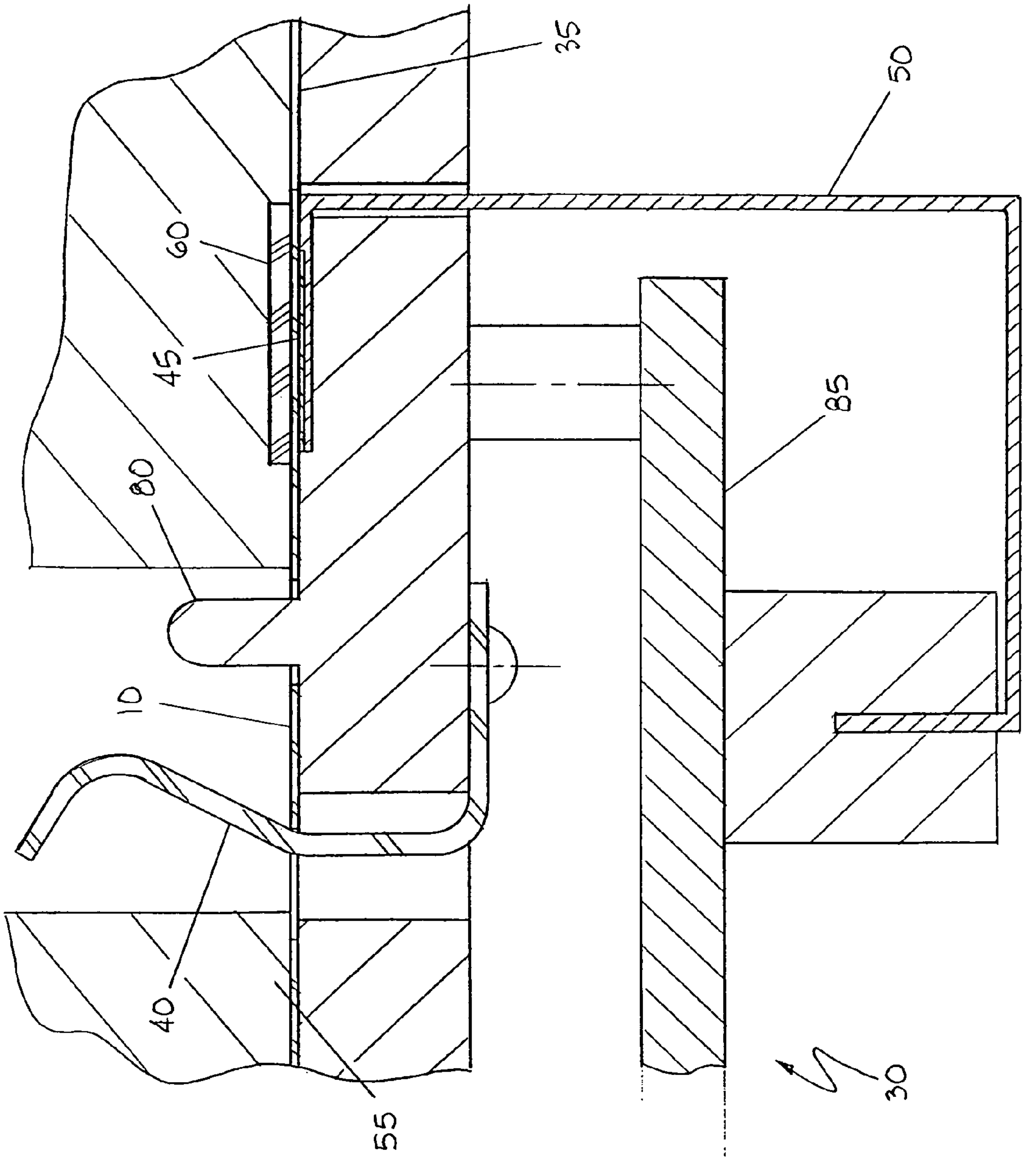
FIG. 5 is a section view 5-5 from FIG. 4*a;*

FIG. 5 refers to section view 5-5 from FIG. 4*a*. This view shows the bistable media 10 on writer surface 35 being tensioned by tensioning mechanism 40 while lying over protrusion 80. The cover 55 can be closed over the bistable media 10 with the compliant section 60 applying the necessary pressure to cause contact of bistable media 10 to writer electrical conductors 45 of flex circuit 50. The flex circuit 50 can be attached to a circuit board 85 located in the writing device 30.

Figure 6:
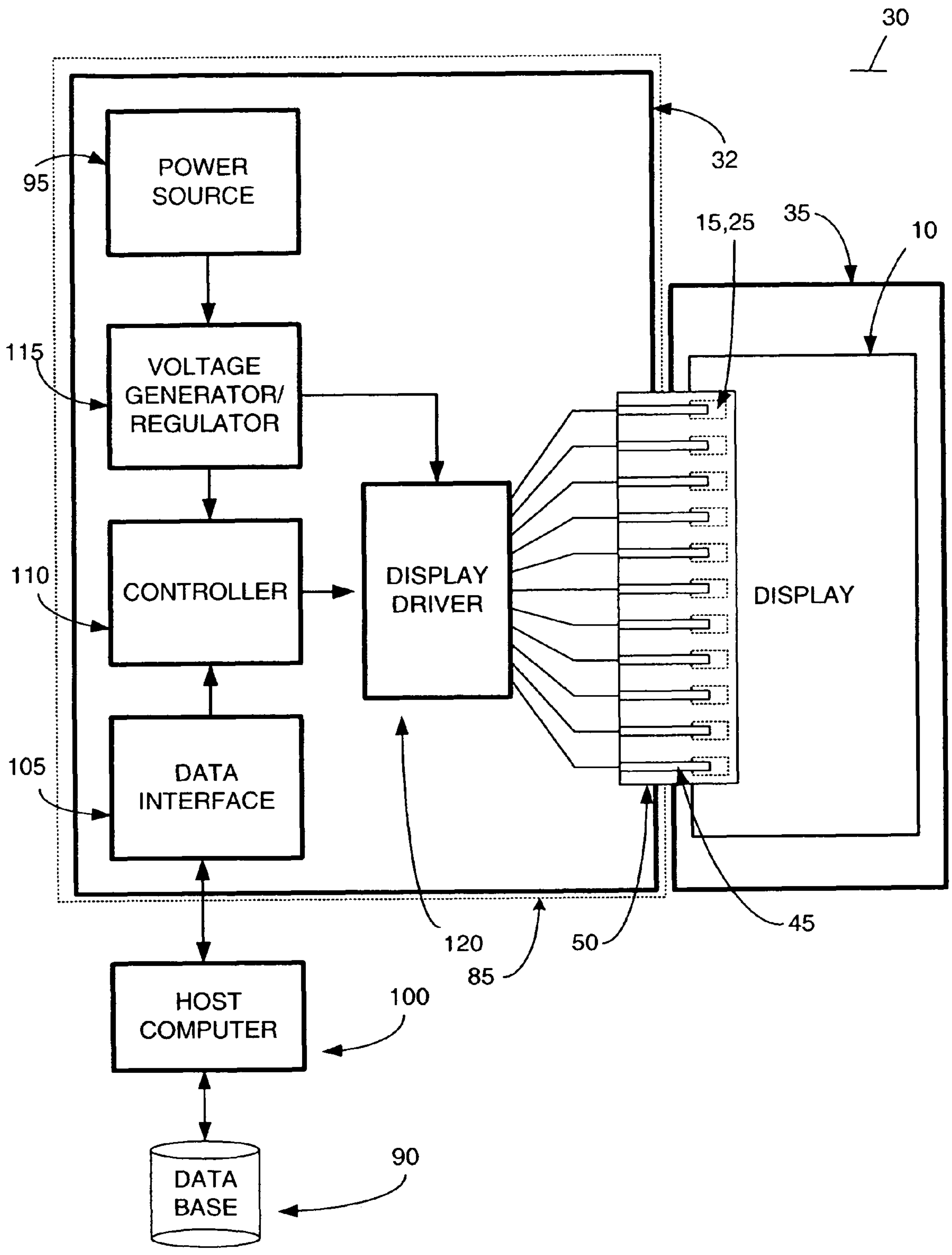
FIG. 6 is a block diagram describing the operation of a sign writing system of a preferred embodiment shown in FIG. 4*a.*

FIG. 6 is an electrical block diagram for the bistable writing system. As shown in FIG. 6, a power source 95 can be located external to the writing device 30. The writing device 30 can include a display drive source 32. A database 90 can contain information about what the bistable display 10 should depict once written. The database 90 can be accessed by a computer 100. The computer 100 can retrieve the necessary data from database 90 and provide appropriate signals to the display drive source 32 to cause a display change. Data from the computer 100 can be received by the display drive source 32 by means of a data interface 105. This data can be transferred between computer 100 and data interface 105 by wired means or wireless means. Data received by data interface 105 can be read by a controller 110, which can interpret the data and generate the signal(s) to a display driver 120 to cause display driver 120 to generate the one or more signal to change the contents of the bistable media 10. The signal(s) generated by the display driver 120 can be transported to the bistable media 10 via one or more writer electrical conductors 45 of flex circuit 50, wherein each of writer electrical conductors 45 can be electrically connected to one of first electrical contacts 15 or second electrical contacts 25 of the bistable display 10. The power source 95 can supply power for a voltage generator/regulator 115. The voltage generator/regulator 115 can generate the voltage necessary to run the display driver 120. Any one or more of the data interface 105, the display driver 120, the controller 110, and voltage generator/regulator 115 can be located on a circuit board 85.

Figure 7:
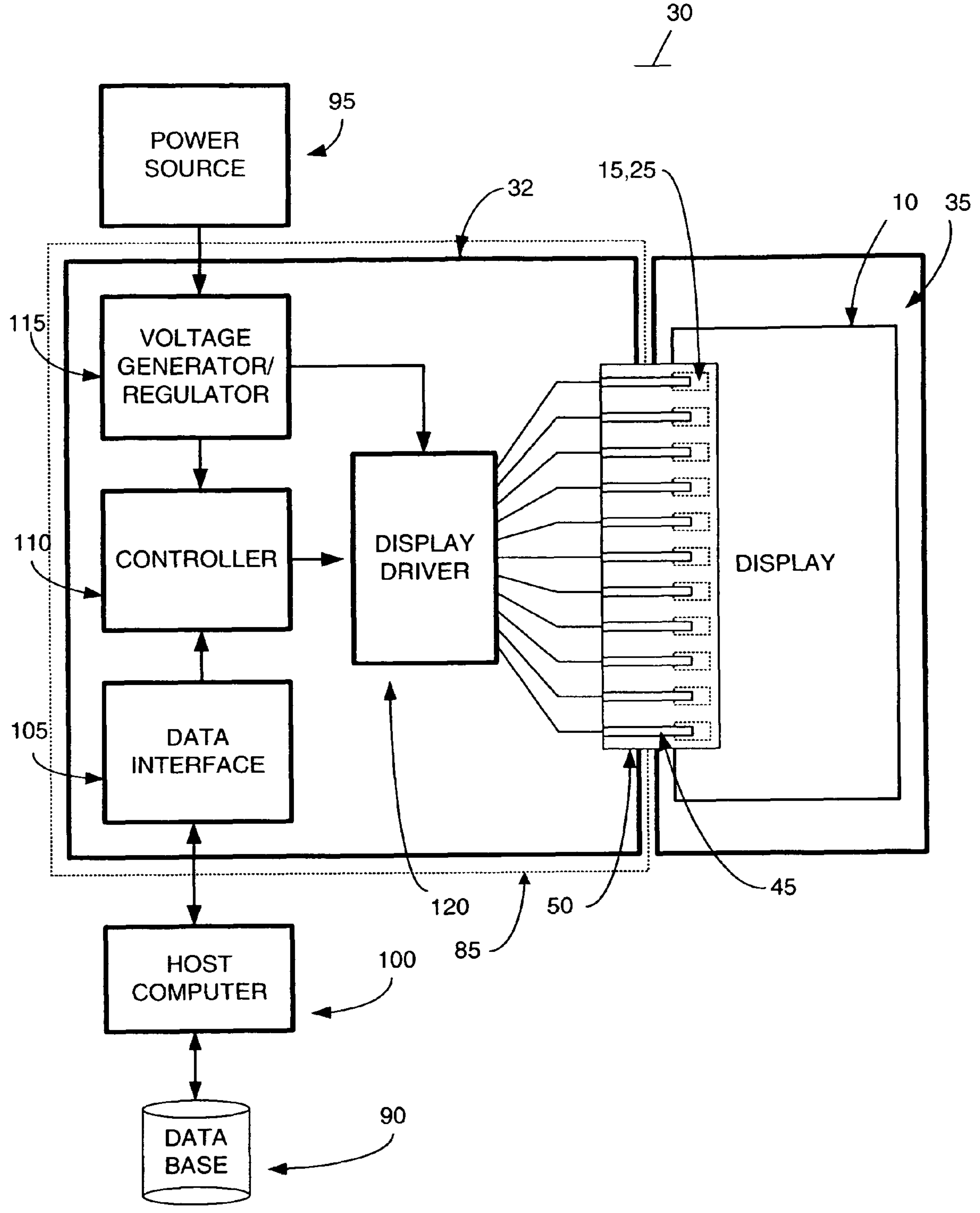
FIG. 7 is a block diagram describing the operation of a sign writing system of a second embodiment shown in FIG. 4*a.*

FIG. 7 is a block diagram of another electrical schematic for a sign writing system, and is identical to FIG. 6 except that the power source 95 is part of the display drive source 32. The power source 95 can be a battery, an integrated solar cell, or any other suitable power source. As shown in FIG. 7, the power source 95 can be located on circuit board 85, or can be separate therefrom.

The invention has been described in detail with particular reference to certain preferred embodiments thereof, but it will be understood that variations and modifications can be effected within the spirit and scope of the invention.

PARTS LIST

10 bistable media
12 through hole
14 flexible substrate
15 first electrical contact
20 bistable material layer
25 second electrical contact
30 writing device
32 display drive source
35 writer surface
40 tensioning mechanism
45 writer electrical conductors
50 flex circuit
55 cover
60 compliant section
65 retention device
70 upper left protrusion
75 lower left protrusion
80 upper right protrusion
85 circuit board
90 data base
95 power source
100 host computer
105 data interface
110 controller
115 voltage generator/regulator
120 display driver

The invention claimed is:

1. A media writing system, wherein the system comprises a writing device and bistable media, wherein:

the bistable media comprises a flexible substrate, a bistable material layer on the substrate, patterned electrical contacts, and at least one through hole in the substrate positioned with regard to one or more electrical contacts; and the writing device comprises a surface having at least one protrusion and a series of electrical conductors, wherein the at least one protrusion protrudes through and has at least a portion in contact with at least one through hole of the media, and the electrical conductors of the writer spatially align with the electrical contacts of the media wherein the writing device comprises a force mechanism which exerts a force on the media to electrically connect the electrical contacts of the media with the electrical conductors of the writing device.

2. The system of claim 1, wherein the electrical contacts of the media are different in number than the electrical conductors of the writer.

3. The system of claim 1, wherein the writer has more than one series of electrical conductors.

4. The system of claim 1, wherein the writing device surface can be curved.

5. The system of claim 1, wherein the writing device further comprises a tensioning mechanism.

6. The system of claim 5, wherein the tensioning mechanism protrudes through and has at least a portion in contact with at least one through hole of the media.

7. The system of claim 1, wherein the patterned electrical contacts of the media comprise a first conductor and a second conductor, wherein at least one of the first or second conductor is patterned.

8. The system of claim 1, wherein the series of electrical conductors is a flex circuit.

9. The system of claim 1, wherein the writing device surface is a rigid circuit board.

10. The system of claim 1, wherein the writing device further comprises a display driver connected to the electrical conductors.

11. The system of claim 1, wherein the writing device further comprises a power source.

12. The system of claim 1, wherein the writing device power source can be a battery.

13. The system of claim 1, wherein the writing device further comprises a data interface connected to the electrical conductors.

14. The system of claim 1, wherein the media is permanently connected to the writing device.

15. The system of claim 1, wherein the writing device comprises a cover which contacts the media on the side opposite the electrical contacts.

16. The system of claim 15, wherein the cover comprises a compliant section.

17. The system of claim 15, wherein the cover is attached to the writing device.

18. The system of claim 15, wherein the cover slidably interacts with the writing device.

19. The system of claim 1, wherein the force mechanism is configured so that the force is a vacuum force.

20. The system of claim 1, wherein the force mechanism is configured so that the force is an adhesive force.

21. The system of claim 1, further comprising a conductive adhesive between the electrical contacts of the media and the electrical conductors of the writer.

22. A method of aligning a bistable media to a writer, wherein the media comprises a flexible substrate, a bistable material layer on the substrate, patterned electrical contacts, and at least one through hole in the substrate positioned with regard to one or more electrical contacts, and wherein the writer comprises a surface having at least one protrusion and a series of electrical conductors, wherein the method comprises contacting the media with the writer, such that at least one protrusion of the writer protrudes through and has at least a portion in contact with at least one through hole of the media, and at least a portion of the electrical conductors of the writer spatially align with the electrical contacts of the media; and exerting a force on the media to electrically connect the electrical contacts of the media with the electrical conductors of the writer.

23. The method of claim 22, wherein the writer further comprises a tensioning mechanism.

24. The system of claim 23, wherein the tensioning mechanism protrudes through and has at least a portion in contact with at least one through hole of the media.

25. The method of claim 22, wherein the writer further comprises two or more protrusions on the surface, and wherein contacting the media with the writer comprises placing the media over the writer and contacting at least a portion of each protrusion of the writer with at least one through hole of the media.

26. The method of claim 22, further comprising applying a voltage to the electrical contacts of the media from the electrical conductors of the writer to write the media.

27. The method of claim 22, wherein the at least one through hole in the media is formed before the patterned electrical contacts.

28. The method of claim 22, wherein the at least one through hole in the media is formed after forming the patterned electrical contacts.

29. The method of claim 22, wherein the at least one through hole in the media is formed simultaneous to forming the patterned electrical contacts.

* * * * *